United States Patent [19]

Faruque

[11] Patent Number: 5,483,667
[45] Date of Patent: Jan. 9, 1996

[54] FREQUENCY PLAN FOR A CELLULAR NETWORK

[75] Inventor: Saleh M. Faruque, Brampton, Canada

[73] Assignee: Northern Telecom Limited, Montreal, Canada

[21] Appl. No.: 89,083

[22] Filed: Jul. 8, 1993

[51] Int. Cl.⁶ .............................. H04Q 7/36; H04Q 7/30
[52] U.S. Cl. .................. 455/33.1; 455/34.1; 455/56.1; 379/59
[58] Field of Search ...................... 455/33.1, 33.2, 455/33.3, 33.4, 63, 56.1, 34.1, 34.2, 54.1, 49.1, 53.1, 103, 132, 272; 379/59, 58, 60

[56] References Cited

U.S. PATENT DOCUMENTS

| 5,111,534 | 5/1992 | Benner ........................ 379/59 |
| 5,233,643 | 8/1993 | Naeini et al. ................ 379/59 |
| 5,247,699 | 9/1993 | Hartman ...................... 379/59 |

FOREIGN PATENT DOCUMENTS

| 0106238 | 6/1985 | Japan ......................... 455/33.1 |
| 9101073 | 1/1991 | WIPO ......................... 455/33.1 |
| 9103911 | 3/1991 | WIPO ......................... 455/33.1 |

Primary Examiner—Edward F. Urban
Assistant Examiner—Nguyen Vo
Attorney, Agent, or Firm—C. W. Junkin; Dallas F. Smith

[57] ABSTRACT

An N=3 frequency plan for 60 degree sector transmit sector receive (STSR) cell sites is based upon dividing available channels into 18 frequency groups. Frequency assignment is in accordance with an odd-even cyclic distribution of channels which provides a three-channel separation between sectors within a cell and at least seven-channel separation between adjacent cells. This ensures adequate channel isolation between sectors and improved adjacent channel C/I performance throughout the network. The N=3 frequency plan increases channel capacity by approximately 38% in AMPS and 114% in TDMA-3.

18 Claims, 5 Drawing Sheets

| 1A | 2A | 3A | 4A | 5A | 6A | 7A | 8A | 9A | 1B | 2B | 3B | 4B | 5B | 6B | 7B | 8B | 9B |
|---|---|---|---|---|---|---|---|---|---|---|---|---|---|---|---|---|---|
| 334 | 335 | 336 | 337 | 338 | 339 | 340 | 341 | 342 | 343 | 344 | 345 | 346 | 347 | 348 | 349 | 350 | 351 |
| 352 | 353 | 354 | | | | | | | | | | | | | | | |
| 355 | 356 | 357 | 358 | 359 | 360 | 361 | 362 | 363 | 364 | 365 | 366 | 367 | 368 | 369 | 370 | 371 | 372 |
| 373 | 374 | 375 | 376 | 377 | 378 | 379 | 380 | 381 | 382 | 383 | 384 | 385 | 386 | 387 | 388 | 389 | 390 |
| 391 | 392 | 393 | 394 | 395 | 396 | 397 | 398 | 399 | 400 | 401 | 402 | 403 | 404 | 405 | 406 | 407 | 408 |
| 409 | 410 | 411 | 412 | 413 | 414 | 415 | 416 | 417 | 418 | 419 | 420 | 421 | 422 | 423 | 424 | 425 | 426 |
| 427 | 428 | 429 | 430 | 431 | 432 | 433 | 434 | 435 | 436 | 437 | 438 | 439 | 440 | 441 | 442 | 443 | 444 |
| 445 | 446 | 447 | 448 | 449 | 450 | 451 | 452 | 453 | 454 | 455 | 456 | 457 | 458 | 459 | 460 | 461 | 462 |
| 463 | 464 | 465 | 466 | 467 | 468 | 469 | 470 | 471 | 472 | 473 | 474 | 475 | 476 | 477 | 478 | 479 | 480 |
| 481 | 482 | 483 | 484 | 485 | 486 | 487 | 488 | 489 | 490 | 491 | 492 | 493 | 494 | 495 | 496 | 497 | 498 |
| 499 | 500 | 501 | 502 | 503 | 504 | 505 | 506 | 507 | 508 | 509 | 510 | 511 | 512 | 513 | 514 | 515 | 516 |
| 517 | 518 | 519 | 520 | 521 | 522 | 523 | 524 | 525 | 526 | 527 | 528 | 529 | 530 | 531 | 532 | 533 | 534 |
| 535 | 536 | 537 | 538 | 539 | 540 | 541 | 542 | 543 | 544 | 545 | 546 | 547 | 548 | 549 | 550 | 551 | 552 |
| 553 | 554 | 555 | 556 | 557 | 558 | 559 | 560 | 561 | 562 | 563 | 564 | 565 | 566 | 567 | 568 | 569 | 570 |
| 571 | 572 | 573 | 574 | 575 | 576 | 577 | 578 | 579 | 580 | 581 | 582 | 583 | 584 | 585 | 586 | 587 | 588 |
| 589 | 590 | 591 | 592 | 593 | 594 | 595 | 596 | 597 | 598 | 599 | 600 | 601 | 602 | 603 | 604 | 605 | 606 |
| 607 | 608 | 609 | 610 | 611 | 612 | 613 | 614 | 615 | 616 | 617 | 618 | 619 | 620 | 621 | 622 | 623 | 624 |
| 625 | 626 | 627 | 628 | 629 | 630 | 631 | 632 | 633 | 634 | 635 | 636 | 637 | 638 | 639 | 640 | 641 | 642 |
| 643 | 644 | 645 | 646 | 647 | 648 | 649 | 650 | 651 | 652 | 653 | 654 | 655 | 656 | 657 | 658 | 659 | 660 |
| 661 | 662 | 663 | 664 | 665 | 666 | | | | | | | | | | | | |
| 717 | 718 | 719 | 720 | 721 | 722 | 723 | 724 | 725 | 726 | 727 | 728 | 729 | 730 | 731 | 732 | 733 | 734 |
| 735 | 736 | 737 | 738 | 739 | 740 | 741 | 742 | 743 | 744 | 745 | 746 | 747 | 748 | 749 | 750 | 751 | 752 |
| 753 | 754 | 755 | 756 | 757 | 758 | 759 | 760 | 761 | 762 | 763 | 764 | 765 | 766 | 767 | 768 | 769 | 770 |
| 771 | 772 | 773 | 774 | 775 | 776 | 777 | 778 | 779 | 780 | 781 | 782 | 783 | 784 | 785 | 786 | 787 | 788 |
| 789 | 790 | 791 | 792 | 793 | 794 | 795 | 796 | 797 | 798 | 799 | | | | | | | |

*Fig. 2*

FREQUENCY PLAN FOR A CELLULAR NETWORK

This invention relates to a frequency plan for a cellular network and is particularly concerned with 60 degree STSR (Sector Transmit Sector Receive).

Reference is directed to a copending patent application Ser. No. 07/957,953, by the same inventor, filed Oct. 8, 1992 and entitled "Non-Interferring Frequency Plan for Cellular Communications System", the entire disclosure of which is hereby incorporated herein by reference.

BACKGROUND TO THE INVENTION

Frequency planning is a method of optimizing spectrum usage, enhancing channel capacity and reducing interference. Frequency planning involves channel numbering, channel grouping into subsets, cell planning and channel assignment. A principal aim of frequency planning is ensuring adequate channel isolation to avoid energy spillover between channels so that adjacent channel interference is reduced to a minimum. A further aim is to provide adequate repeat distance in order to ensure co-channel interference is acceptable while maintaining a high channel capacity. Although new techniques such as NANPS (Narrowband Advanced Mobile Phone System) and TDMA (Time Division Multiple Access) are available to alleviate these problems, additional techniques are needed to further enhance the cellular network's capacity.

SUMMARY OF THE INVENTION

An object of the present invention is to provide an improved frequency plan for a cellular network.

In accordance with the present invention there is provided in a sixty degree sector transmit sector receive cellular network with an N=3 frequency plan wherein available channel frequencies are divided into eighteen frequency groupings, a method of assigning frequencies comprising the steps of forming a generally triangular first three-cell cluster, dividing each cell of the three-cell cluster into six sectors, and for said assigning each cell, in an order, one frequency grouping to each sector to provide a separation of three channel frequencies between each sector and a separation of at least seven channel frequencies between adjacent cells cells.

An embodiment of the present invention includes the step of allowing cell growth within the cellular network by forming a second triangular three-cell cluster, dividing each cell of the three-cell cluster into six sectors, and assigning one frequency grouping to each sector to provide a separation of three channel frequencies between each sector within said each cell and a separation of at least seven channel frequencies between adjacent cells cells.

In accordance with another aspect of the present invention a base station for sixty degree sector transmit sector receive cellular network with an N=3 frequency plan wherein available channel frequencies were divided into eighteen frequency groupings, the base station comprising: a first plurality of transmitters for a first subset of channel frequencies; a first combiner for combining output from the first plurality of transmitters; a first duplexer for providing the combined output to a first transmitting/receiving antenna for transmission; a second plurality of transmitters for a second subset of channel frequencies; a second combiner for combining output from the second plurality of transmitters; a second duplexer for providing the combined output to a second transmitting/receiving antenna for transmission; a first receive multi-coupler connected to the first duplexer for receiving a signal from the first antenna; a second receive multi-coupler connected to the second duplexer for receiving a signal from the second antenna; a first receiver having a primary splitter connected to the first duplexer and a primary receiver and a secondary splitter connected to the second duplexer and a secondary receiver; and a second receiver having a primary splitter connected to the second duplexer and a secondary splitter connected to the first duplexer.

The N=3 frequency plan, based on 18 frequency groups in accordance with the present invention, has several advantages. Frequency assignment being based on an ODD/EVEN cyclic distribution of channels ensures adequate channel isolation between sectors and improved adjacent channel C/I performance throughout the network. The channel capacity is increased by approximately 38% in AMPS and approximately 114% in TDMA-3.

BRIEF DESCRIPTION OF THE DRAWINGS

The present invention will be further understood from the following description with reference to the drawings in which:

FIG. 2 illustrates an N=3 frequency plan in accordance with one embodiment of the present invention;

Similar references are used in different figures to denote similar components.

DETAILED DESCRIPTION

Figure 1:
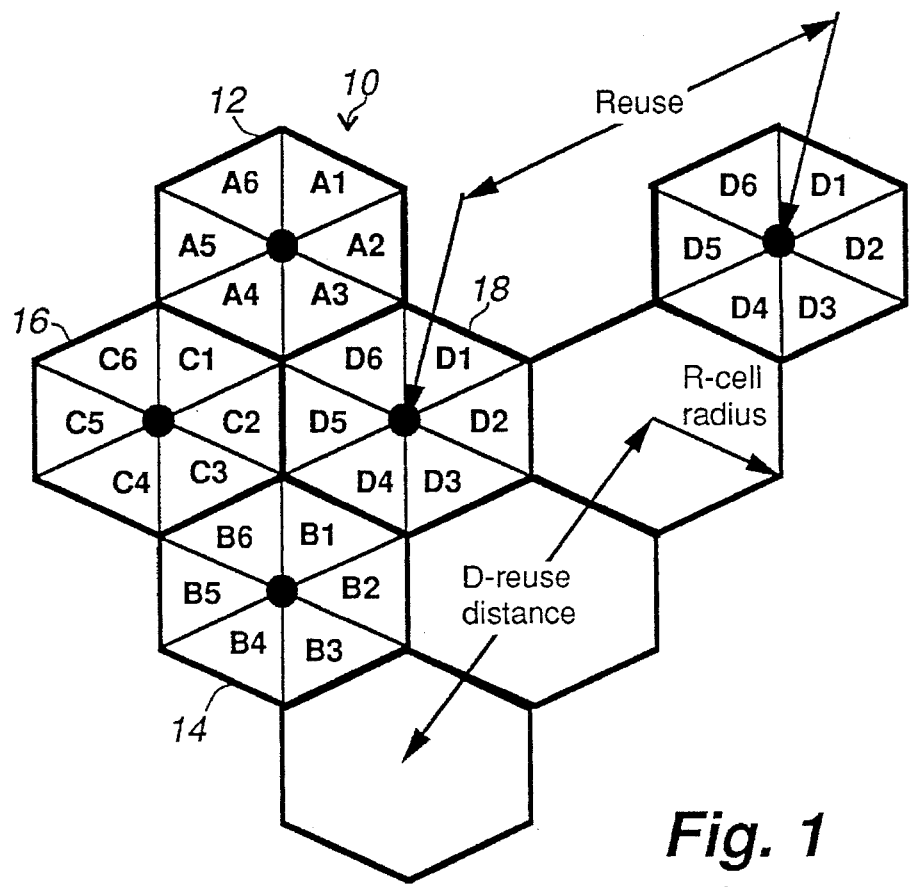
FIG. 1 illustrates a known 4-cell sector pattern with 24 sectors.

Referring to FIG. 1, there is illustrated a known 4-cell sector pattern with 24 sectors. Each 4-cell cluster 10 includes cells 12, 14, 16, and 18 in which each cell is divided into 6 sectors A1–A6, B1–B6, C1–C6, and D1–D6, respectively. The numbering plan on which this 4-cell cluster is based is known as the N=4, 60 degree STSR plan. The N=4, 60 degree STSR plan is based upon dividing the available channels into 24 frequency groups where one group assigned per sector. Control channel assignment is based on distributing 21 control channels among the 21 sectors; three control channels are re-used among the remaining three frequency groups. Alternatively, three voice channels are used as control channels at the expense of capacity. Channel capacity/sector in this plan is limited to 333/24≈13.

Referring to FIG. 2, there is illustrated an N=3 frequency plan in accordance with an embodiment of the present invention. The N=3 frequency plan is based upon dividing the available channels into 18 frequency groups. The N=3 frequency plan provides 333/18≈18 channels per group in non-expanded spectrum and 416/18≈23 channels per group with expanded spectrum.

Figure 3:
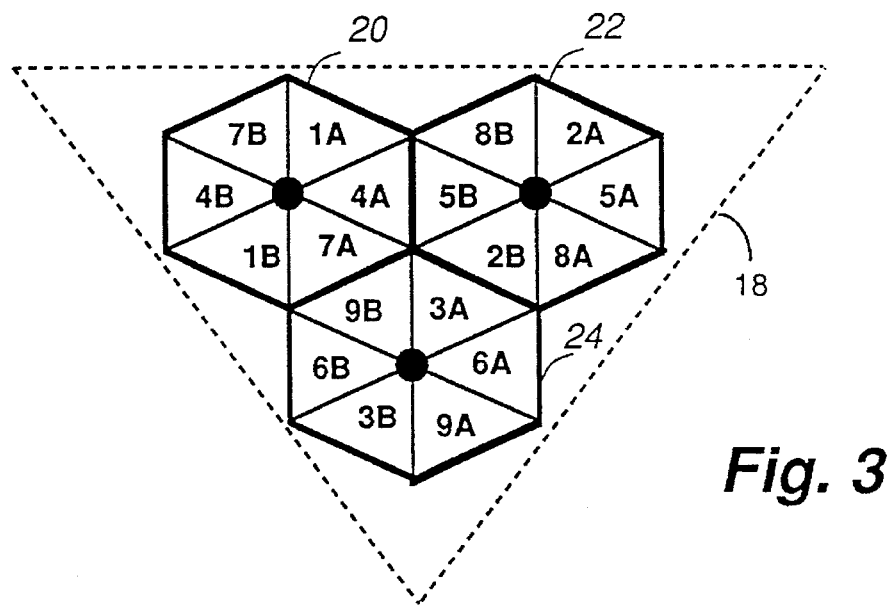
FIG. 3 illustrates a cell cluster for the N=3 frequency plan of FIG. 2.

Referring to FIG. 3 there is illustrated a cell cluster for the N=3 frequency plan of FIG. 2. The generally triangular three cell cluster 18 is based on three cells 20, 22, and 24, with six sectors/cell for a total of 18 sectors/cluster. Channel distribution is based on an ODD/EVEN cyclic distribution of channels which ensures adequate channel isolation between sectors and better adjacent channel C/I performance throughout the network. As shown in FIG. 2, one frequency group is assigned per sector for a total of 6×23=138 channels/cell. Thus, cell 20 has frequency-groups 1A, 4A, 7A, 1B, 4B, 7B, the cell 22 has frequency groups 2A, 5A, 8A, 2B, 5B, 8B, and the cell 24 has frequency groups 3A, 6A, 9A, 3B, 6B, 9B. This translates into 38% channel enhancement over the N=4 frequency plan of FIG. 1. With TDMA-3, the capacity is further enhanced by a factor of 3.

Figure 4:
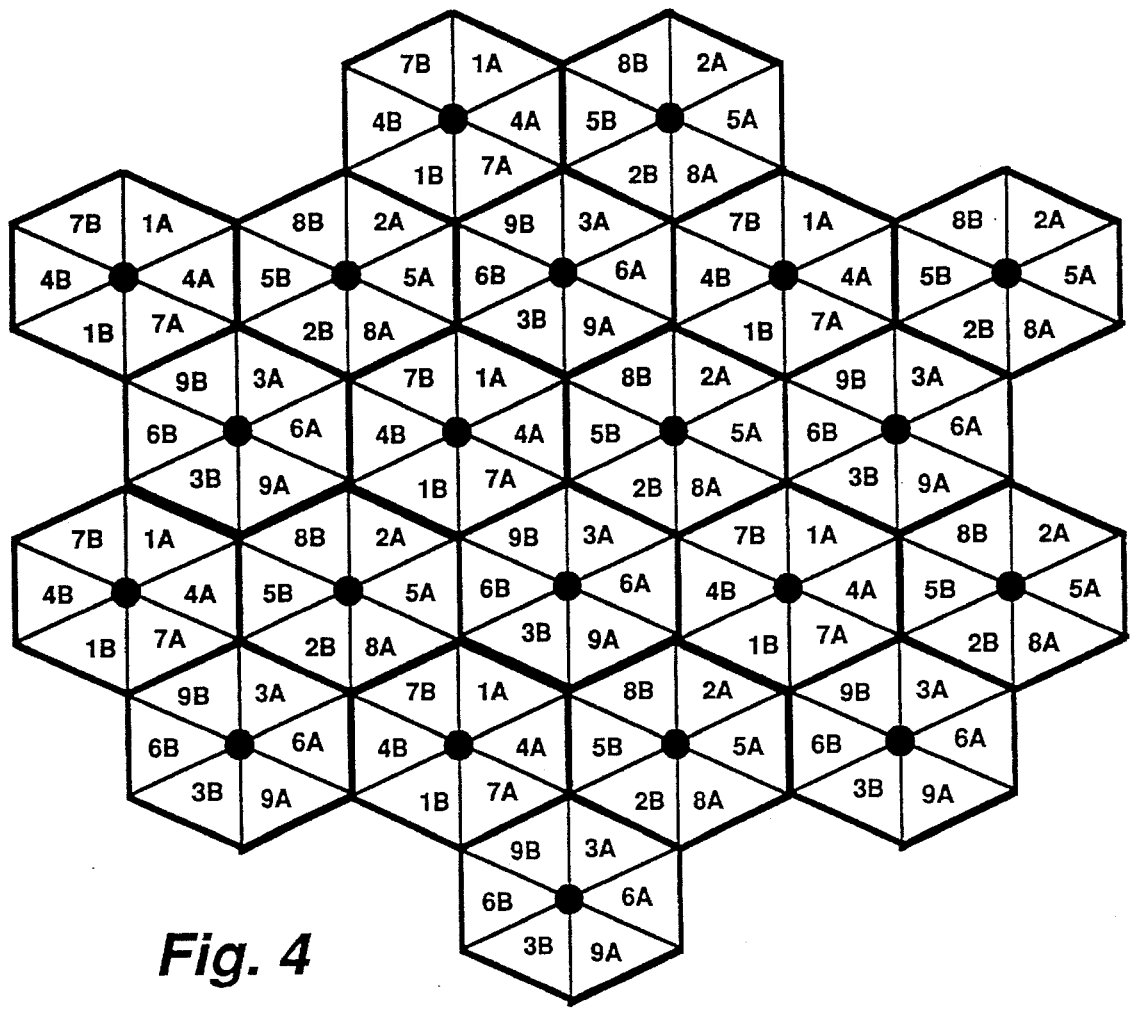
FIG. 4 illustrates a cell growth plan for the N=3 frequency plan of FIG. 2.

A growth plan for the N=3 60 degree STSR numbering plan is based on repeating the cells in groups of three as illustrated in FIG. 4.

Combiners are bandpass filters connected in parallel in groups of four(typically). As a result the effective radiated power (ERP) is reduced due to selectivity, and return loss. Intermodulation products are also generated when several channels are combined into one. A solution to this problem is to provide a wider channel separation in the frequency group. Typically a channel separation of twenty-on or greater is sought. Although high selectivity combiners are available to alleviate this problem, better techniques must be provided to further enhance the system performance.

Figure 5:
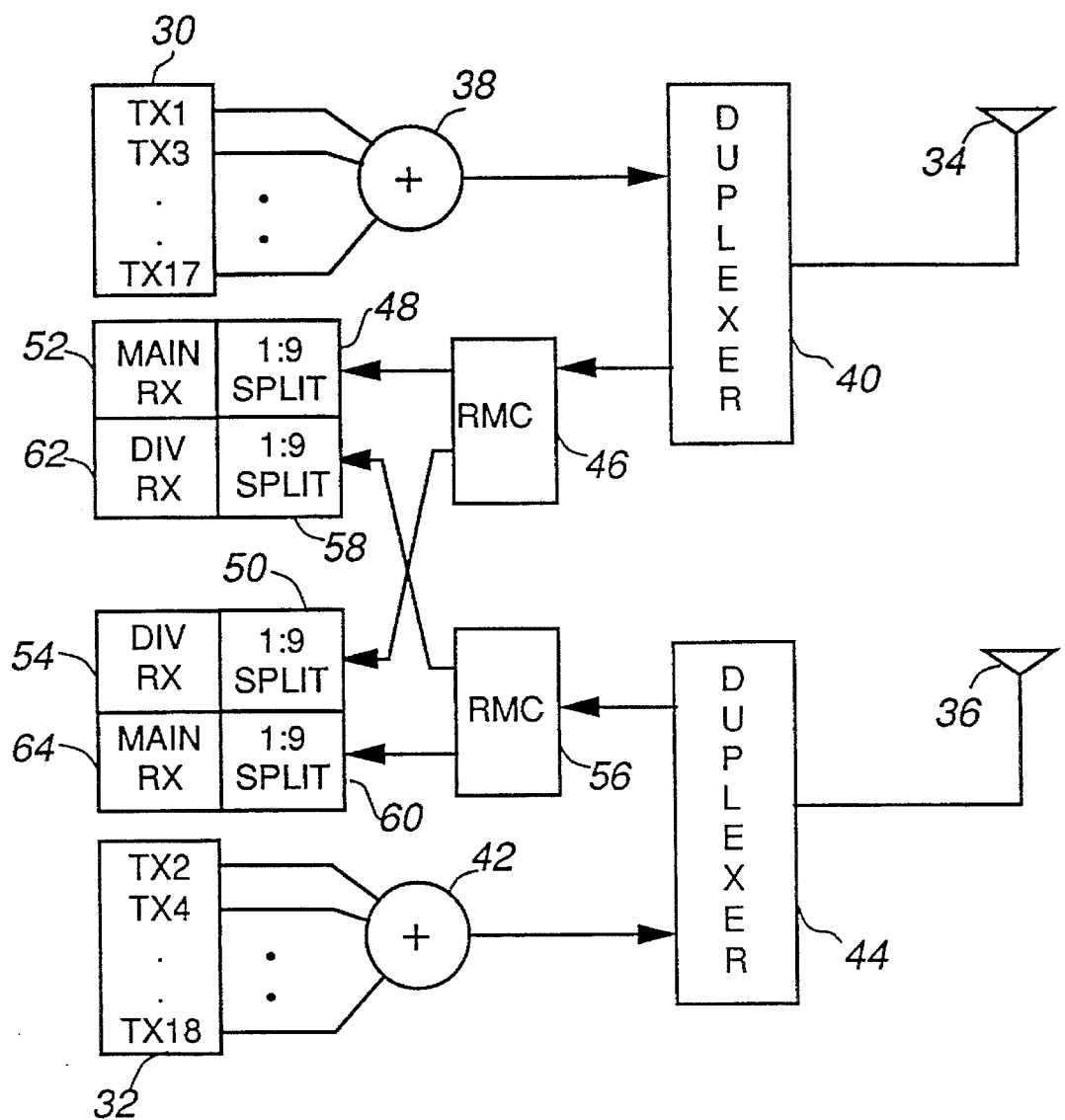
FIG. 5 illustrates, in a block diagram, a base station in accordance with an embodiment of the present invention.

Referring to FIG. 5, there is illustrated, in a block diagram, a base station for use with the present frequency plan that mitigates the problem described hereinabove. The base station includes two multichannel transmitters 30 and 32 for each of two antennas, a main 34 and a diversity 36. The multi-channel transmitter 30 for 'odd' channels in a frequency group is coupled to the main antenna 34. The multi-channel transmitter 32 for 'even' channels in a frequency group is coupled to the diversity antenna 36. The multi-channel transmitter 30 is coupled to the main antenna 34 via a 9-channel combiner 38 and a duplexer 40. The multi-channel transmitter 32 is coupled to the diversity antenna 36 via a 9-channel combiner 42 and a duplexer 44. On the receiver side, the duplexer 40 is connected to a receive multi-coupler (RMC) 46 which is in turn connected to 1:9 splitters 48 and 50, main receiver 52 and diversity receiver 54, respectively. Similarly, the duplexer 44 is connected to a receive multi-coupler (RMC) 56 which is in turn connected to 1:9 splitters 58 and 60, diversity receiver 62 and main receiver 64, respectively.

In operation, the available channels in a frequency group are divided into two sub-groups, an ODD Group and an EVEN Group. Within each frequency group, the ODD group is formed by combining row-1, row-3, row-5, ... from FIG. 2, while the EVEN group is formed by combining row-2, row-4, row-6 ... from FIG. 2. Thus, using the base station of FIG. 5 with the present N=3 frequency plan, the effective channel separation as seen by the combiner is 18×2×30 kHz=1080 kHz, which is adequate for all practical purposes. The combined signals are then transmitted through separate antennas. Diversity signals are received on a shared basis as indicated in FIG. 5. Additional antennas are not needed in this configuration. By using, the diversity antenna for both transmitting and receiving, the channel separation is doubled over transmitting solely via the main antenna.

Figure 6:
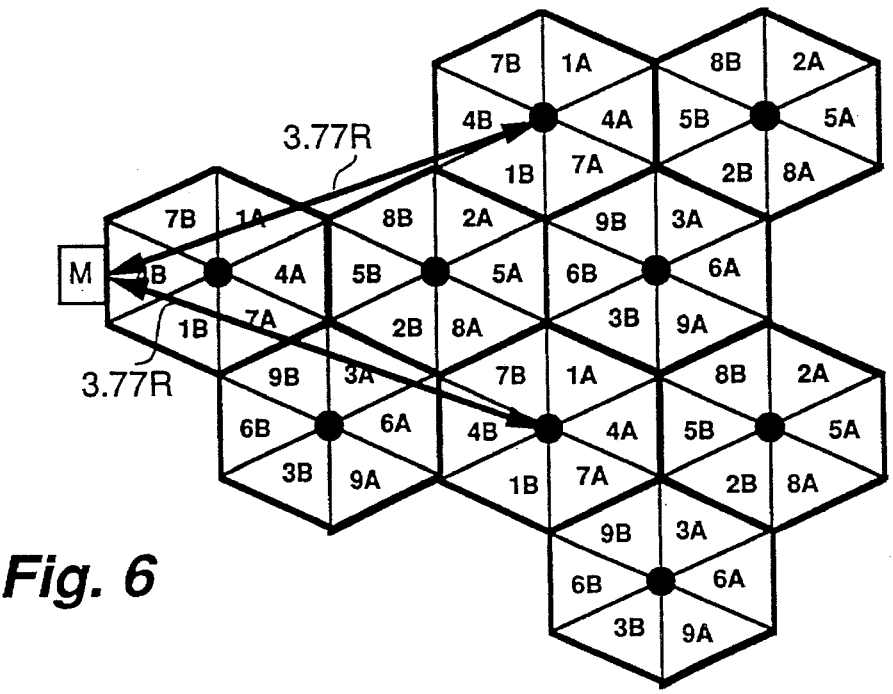
FIG. 6 illustrates co-channel interference evaluation for the N=3 frequency plan of FIG. 2.

Referring to FIG. 6, there is illustrated co-channel interference evaluation for the N=3 frequency plan of FIG. 2. The N=3, 60 STSR plan is based on dividing a cell into 6 sectors where directional antennas with downtilt are used in each sector. Thus, antenna configuration and their directivity play an important role in determining the C/I performance. Note that a sectorized site, using directional antennas with downtilt, provides line of sight propagation in the serving base and out of sight propagation in adjacent bases as described in the above incorporated pending patent application. Since line of sight propagation closely approximates square law attenuation and out of sight propagation approximates 4th power attenuation, antenna directivity improves C/I performance due to antenna orientation as well as due to different propagation factors. These assumptions modify the C/I prediction as given by equation 1:

$$C/I = 10 \log \left[ \frac{1}{2} \left( \frac{\phi_c}{\phi_i} \right) \left( \frac{d_c^{-\mu_1}}{\sum_i d_i^{-\mu_2}} \right) \right] \quad (1)$$

where:

i=1,2, (Two distances of 3.77 R, see FIG. 6)

R=Cell radius $d_i$=interferer distance $d_c$=carrier distance $\phi_c/\phi_i$=Antenna directivity factor $\mu_1$ =Line of Sight attenuation factor $\mu_2$ =Out of Sight attenuation factor from other sites where $\mu_2 > \mu_1$ Thus, referring to FIG. 6 and using a frequency repeat distances of 3.77 and propagation factors $\mu_1=2$, $\mu_2=4$, the co-channel interference(C/I) as function of antenna directivity can be evaluated as:

$$\begin{aligned} C/I &= 20 \text{ dB} & \phi_c/\phi_i &= 0 \text{ dB} \\ &= 23 \text{ dB} & \phi_c/\phi_i &= 3 \text{ dB} \\ &= 26 \text{ dB} & \phi_c/\phi_i &= 6 \text{ dB} \\ &= 29 \text{ dB} & \phi_c/\phi_i &= 9 \text{ dB} \end{aligned} \quad (2)$$

The performance can be further improved by using high gain antennas having a large front to back ratio.

In addition to enhancing channel capacity and C/I performance, a frequency plan must also provide an easy transition to 60 STSR plan from the existing N=4 plan.

As described hereinabove with regard to FIG. 1, the N=4, 60 degree STSR plan is based on dividing the available channels into 24 frequency groups where one group is assigned per sector. Control channel assignment is based on distributing 21 control channels among 21 sectors; three control channels are re-used among the remaining three frequency groups. Alternately, three voice channels are used as control channels at the expense of capacity. In FIG. 7a there is illustrated an N=4 cell cluster where all channels are evenly distributed among 24 sectors. Channel capacity/sector in this plan is limited to 333/24=13 compared to 18 in N=3 plan (non-expanded spectrum) and 416/24=17 compared to 23 in N=3 plan (expanded spectrum).

Figure 7:
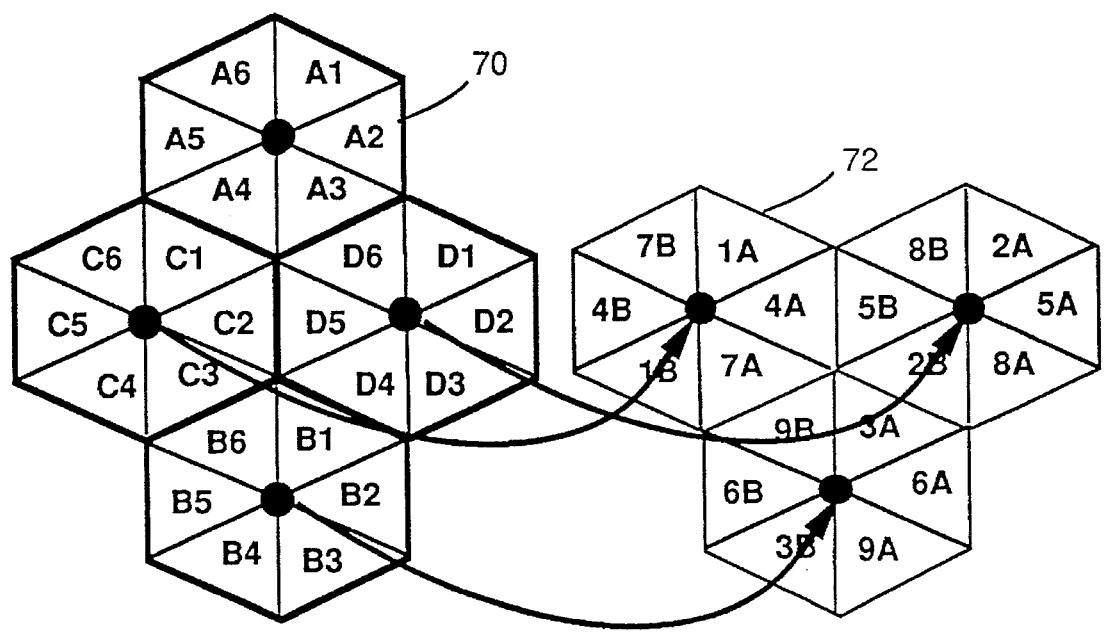
FIG. 7 illustrate N=4 and N=3 cell clusters, respectively, with transition from N=4 to N=3 indicated.

The N=4, 60 degree STSR cell 70 of FIG. 7 can be converted into an N=3, 60 degree STSR cell by forming a 3-cell cluster 72 and assigning channels according to the ODD/EVEN cyclic distribution scheme described hereinabove. The 4th cell from the original N=4 cluster can be reassigned to form an adjacent N=3 cell cluster.

The N=3 frequency plan, based on 18 frequency groups in accordance with the present invention, has several advantages. Frequency assignment being based on an ODD/EVEN cyclic distribution of channels ensures adequate channel isolation between sectors and improved adjacent channel C/I performance throughout the network. The channel capacity is increased by approximately 38% in AMPS and approximately 114% in TDMA-3.

Numerous modifications, variations and adaptations may be made to the particular embodiments of the invention described above without departing from the scope of the invention, which is defined in the claims.

What is claimed is:

1. In a sixty degree sector transmit sector receive cellular network with an N=3 frequency plan wherein available channel frequencies are divided into eighteen frequency groupings, a method of assigning frequencies comprising the steps of:

forming a generally triangular first three-cell cluster;

dividing each cell of the first three-cell cluster into six sectors; and for said each cell, assigning, in an order, one frequency grouping to each sector to provide a separation of three channel frequencies between each sector within said each cell and a separation of at least seven channel frequencies between adjacent cells.

2. A method as claimed in claim 1 further comprising the step of allowing cell growth within the cellular network by forming a second generally triangular three-cell cluster, dividing each cell of the second three-cell cluster into six sectors, and assigning one frequency grouping to each sector of said each cell of the second three-cell cluster in the order of said first three-cell cluster.

3. A method as claimed in claim 2 wherein the frequency groupings are labeled 1A, 2A, 3A, 4A, 5A, 6A, 7A, 8A, 9A, 1B, 2B, 3B, 4B, 5B, 6B, 7B, 8B, 9B.

4. A method as claimed in claim 3 wherein the order of assigning one frequency grouping to each sector for a first cell in the second three-cell cluster is 1A, 4A, 7A, 1B, 4B, 7B.

5. A method as claimed in claim 4 wherein the order of assigning one frequency grouping to each sector for a second cell in the second three-cell cluster is 2A, 5A, 8A, 2B, 5B, 8B.

6. A method as claimed in claim 5 wherein the order of assigning one frequency grouping to each sector for a third cell in the second three-cell cluster is 3A, 6A, 9A, 3B, 6B, 9B.

7. A method as claimed in claim 6 wherein a sector of the first cell in the second three-cell cluster, assigned the frequency grouping 4A, abuts a sector of the second cell in the second three-cell cluster, assigned the frequency grouping 5B.

8. A method as claimed in claim 6 wherein a sector of the second cell in the second three-cell cluster, assigned the frequency grouping 2B, abuts a sector of the third cell in the second three-cell cluster, assigned the frequency grouping 3A.

9. A method as claimed in claim 6 wherein a sector of the third cell in the second three-cell cluster, assigned the frequency grouping 9B, abuts a sector of the first cell in the second three-cell cluster, assigned the frequency grouping 7A.

10. A method as claimed in claim 1 wherein the frequency groupings are labeled 1A, 2A, 3A, 4A, 5A, 6A, 7A, 8A, 9A, 1B, 2B, 3B, 4B, 5B, 6B, 7B, 8B, 9B.

11. A method as claimed in claim 10 wherein the order of assigning one frequency grouping to each sector for a first cell in the first three-cell cluster is 1A, 4A, 7A, 1B, 4B, 7B.

12. A method as claimed in claim 11 wherein the order of assigning one frequency grouping to each sector for a second cell in the first three-cell cluster is 2A, 5A, 8A, 2B, 5B, 8B.

13. A method as claimed in claim 12 wherein the order of assigning one frequency grouping to each sector for a third cell in the first three-cell cluster is 3A, 6A, 9A, 3B, 6B, 9B.

14. A method as claimed in claim 13 wherein a sector of the first cell in the first three-cell cluster, assigned the frequency grouping 4A, abuts a sector of the second cell in the first three-cell cluster, assigned the frequency grouping 5B.

15. A method as claimed in claim 13 wherein a sector of the second cell in the first three-cell cluster, assigned the frequency grouping 2B, abuts a sector of the third cell in the first three-cell cluster, assigned the frequency grouping 3A.

16. A method as claimed in claim 13 wherein a sector of the third cell in the first three-cell cluster, assigned the frequency grouping 9B, abuts a sector of the first cell in the first three-cell cluster, assigned the frequency grouping 7A.

17. A base station for sixty degree sector transmit sector receive cellular network with an N=3 frequency plan wherein available channel frequencies are divided into eighteen frequency groupings, the base station comprising:

a first plurality of transmitters for a first subset of the available channel frequencies;

a first combiner for combining output from the first plurality of transmitters;

a first duplexer for providing the combined output to a first transmitting/receiving antenna for transmission;

a second plurality of transmitters for a second subset of the available channel frequencies;

a second combiner for combining output from the second plurality of transmitters;

a second duplexer for providing the combined output from the second combiner to a second transmitting/receiving antenna for transmission;

a first receive multi-coupler connected to the first duplexer for receiving a signal from the first antenna;

a second receive multi-coupler connected to the second duplexer for receiving a signal from the second antenna;

a first receiver having a primary splitter connected between the first receive multi-coupler and a primary receiver and a secondary splitter connected between the second multi-coupler and a secondary receiver; and a second receiver having a primary splitter connected to the second receive multi-coupler and a secondary splitter connected to the first receive multi-coupler.

18. A base station as claimed in claim 17 wherein the first subset of the available channel frequencies includes every odd channel of a frequency grouping and the second subset of the available channel frequencies includes every even channel of the frequency grouping wherein channel separation is doubled compared with transmitting with a single antenna.

* * * * *